United States Patent
Shioiri (10) Patent No.: US 11,022,187 B2
(45) Date of Patent: Jun. 1, 2021

(54) ENGAGEMENT DEVICE

(71) Applicant: TOYOTA JIDOSHA KABUSHIKI KAISHA, Toyota (JP)

(72) Inventor: Hiroyuki Shioiri, Yokohama (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 20 days.

(21) Appl. No.: 16/504,061

(22) Filed: Jul. 5, 2019

(65) Prior Publication Data

US 2021/0003180 A1 Jan. 7, 2021

(51) Int. Cl.
*F16D 41/14* (2006.01)
*F16D 41/12* (2006.01)

(52) U.S. Cl.
CPC ............ *F16D 41/125* (2013.01); *F16D 41/14* (2013.01)

(58) Field of Classification Search
CPC ... F16D 41/125; F16D 41/14; F16D 2023/123
See application file for complete search history.

(56) References Cited

U.S. PATENT DOCUMENTS

| | | | |
|---|---|---|---|
| 5,896,969 A * | 4/1999 | Meier-Burkamp | F16D 41/14 192/46 |
| 6,244,965 B1 | 6/2001 | Klecker et al. | |
| 9,726,236 B2 | 8/2017 | Papania | |
| 10,006,507 B2 * | 6/2018 | Lee | F16D 41/12 |
| 10,151,359 B2 * | 12/2018 | Campton | F16D 41/14 |
| 2004/0025618 A1 | 2/2004 | Thery | |
| 2015/0354640 A1 * | 12/2015 | Papania | F16D 25/00 192/46 |
| 2016/0369855 A1 * | 12/2016 | Essenmacher | F16D 41/14 |
| 2017/0138416 A1 * | 5/2017 | Lee | F16D 41/16 |
| 2017/0343061 A1 * | 11/2017 | Campton | F16D 41/14 |

FOREIGN PATENT DOCUMENTS

| | | |
|---|---|---|
| EP | 0979360 B1 | 6/2004 |
| JP | H02102964 A | 4/1990 |
| JP | 2004538427 A | 12/2004 |
| JP | 4105240 B2 | 6/2008 |
| JP | 2008248915 A | 10/2008 |
| JP | 2010261582 A | 11/2010 |
| JP | 2013047532 A | 3/2013 |
| JP | 2016508582 A | 3/2016 |
| WO | 98/49456 A1 | 11/1998 |
| WO | 02/099313 A1 | 12/2002 |
| WO | 2014/120595 A1 | 8/2014 |

* cited by examiner

*Primary Examiner* — David R Morris
(74) *Attorney, Agent, or Firm* — Hunton Andrews Kurth LLP (57) ABSTRACT

An engagement device includes: a clutch unit including annular input and output elements disposed so as to face each other in an axial direction, plate-shaped engagement pieces provided in the input element or the output element, and an annular selector plate disposed between the input and output elements to switch a posture of the engagement pieces and switched between an engagement state and a release state; and an actuator operating the selector plate and control the engagement state and the release state of the clutch unit. Further, the actuator includes an actuator main body generating a force for operating the selector plate, and the actuator main body is disposed radially inwards beyond the clutch unit.

11 Claims, 7 Drawing Sheets

FIG.2

AXIAL DIRECTION

AXIAL DIRECTION

FIG.7

ENGAGEMENT DEVICE

BACKGROUND

The present disclosure relates to an engagement device.

As a type of engagement device, there is known a clutch unit that switches between a power transmission mode and a power cut-off mode using engagement pieces. In the clutch unit, an engagement state where power can be transmitted and a release state where power is cut off are switched by controlling the position and the posture of the engagement pieces. For example, the clutch unit includes an annular selector plate as a member for switching the posture of the engagement pieces. In this case, a rotation of the selector plate rotation causes to change the posture of the engagement pieces, and then it is possible to switch between the engagement state and the release state of the clutch unit. The selector plate is connected to an actuator and is capable of rotating as a switching operation by using a force from the actuator acting on the selector plate.

Japanese Patent No. 4105240 discloses a clutch unit having engagement pieces and a selector plate, in which a shaft (actuator shaft) for selector plate rotation is disposed on the inner diameter side of the clutch unit.

In the configuration described in Japanese Patent No. 4105240, an actuator main body that generates a force for shaft (actuator shaft) rotation is disposed at an axial position different from that of the clutch unit. Accordingly, in the structure including the clutch unit and the actuator, the size of the engagement device may be greater in the axial direction.

In a clutch unit where a power transmits from an input element to an output element, both the input element and the output element rotate, and thus an actuator connected to a selector plate also rotates. N this case, if the actuator is disposed on the radially outer side of the clutch unit, a space corresponding to the size of the rotational trajectory of the actuator is required, and thus the size of the engagement device may be increased in the radial direction.

SUMMARY

There is a need for providing an engagement device capable of suppressing an increase in the size of a structure including a clutch unit using engagement pieces and an actuator to control the clutch unit.

According to an embodiment, an engagement device includes: a clutch unit including annular input and output elements disposed so as to face each other in an axial direction, plate-shaped engagement pieces provided in either the input element or the output element, and an annular selector plate disposed between the input element and the output element and switching a posture of the engagement pieces to switch between an engagement state where power is transmitted between the input element and the output element, which are interconnected by the engagement pieces, and a release state where power transmission is cut off between the input element and the output element by changing the posture of the engagement pieces by rotating the selector plate; and an actuator operating the selector plate and controlling the engagement state and the release state of the clutch unit. Further, the actuator includes an actuator main body generating a force for operating the selector plate, and the actuator main body is disposed radially inwards beyond the clutch unit.

DETAILED DESCRIPTION

Hereinafter, an engagement device according to embodiments of the present disclosure will be described in detail with reference to the accompanied drawings. Note that the present disclosure is not limited to the embodiments described below.

First Embodiment

Figure 1:
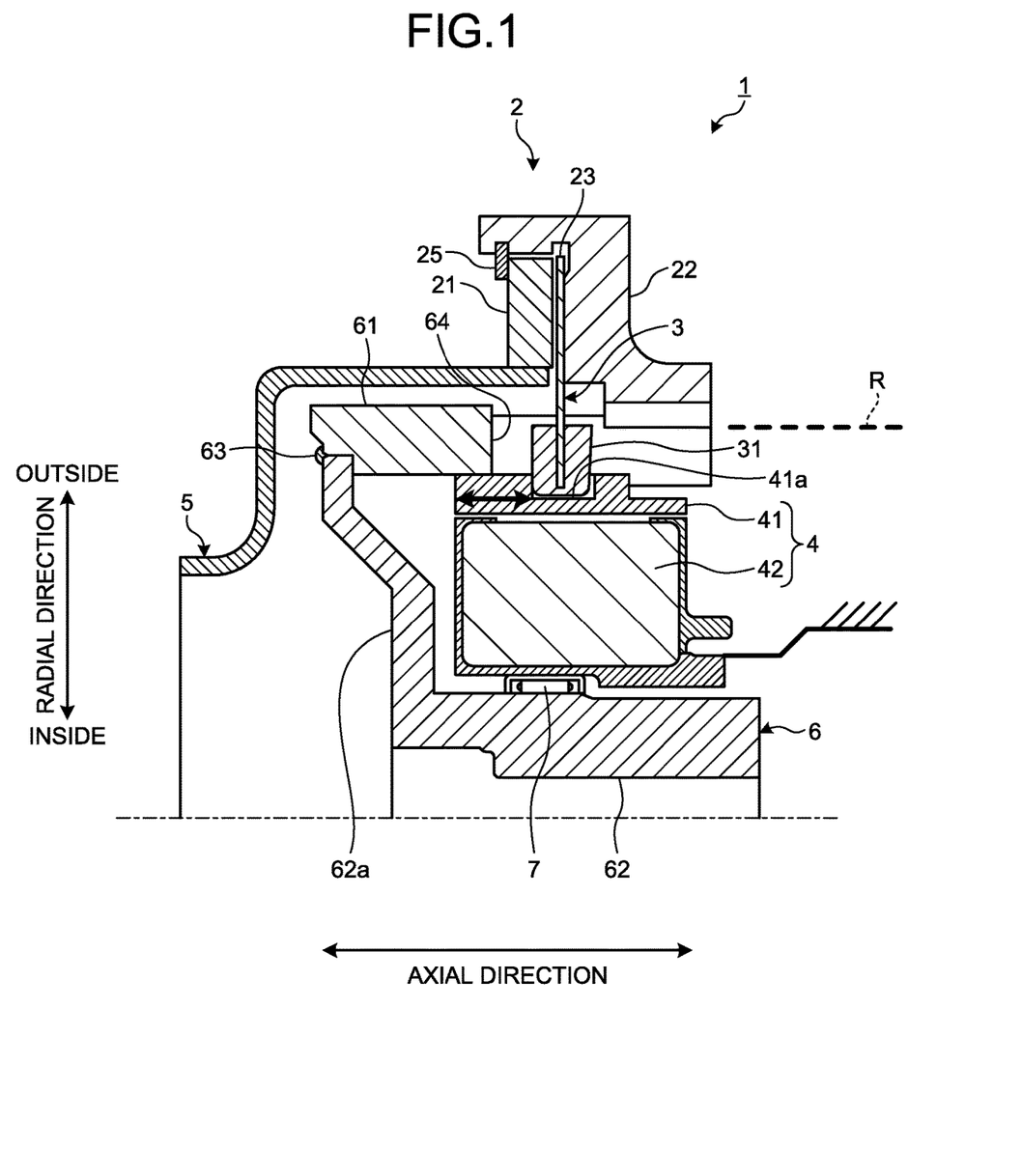
FIG. 1 is a cross-sectional view schematically illustrating an engagement device according to a first embodiment.
Figure 2:
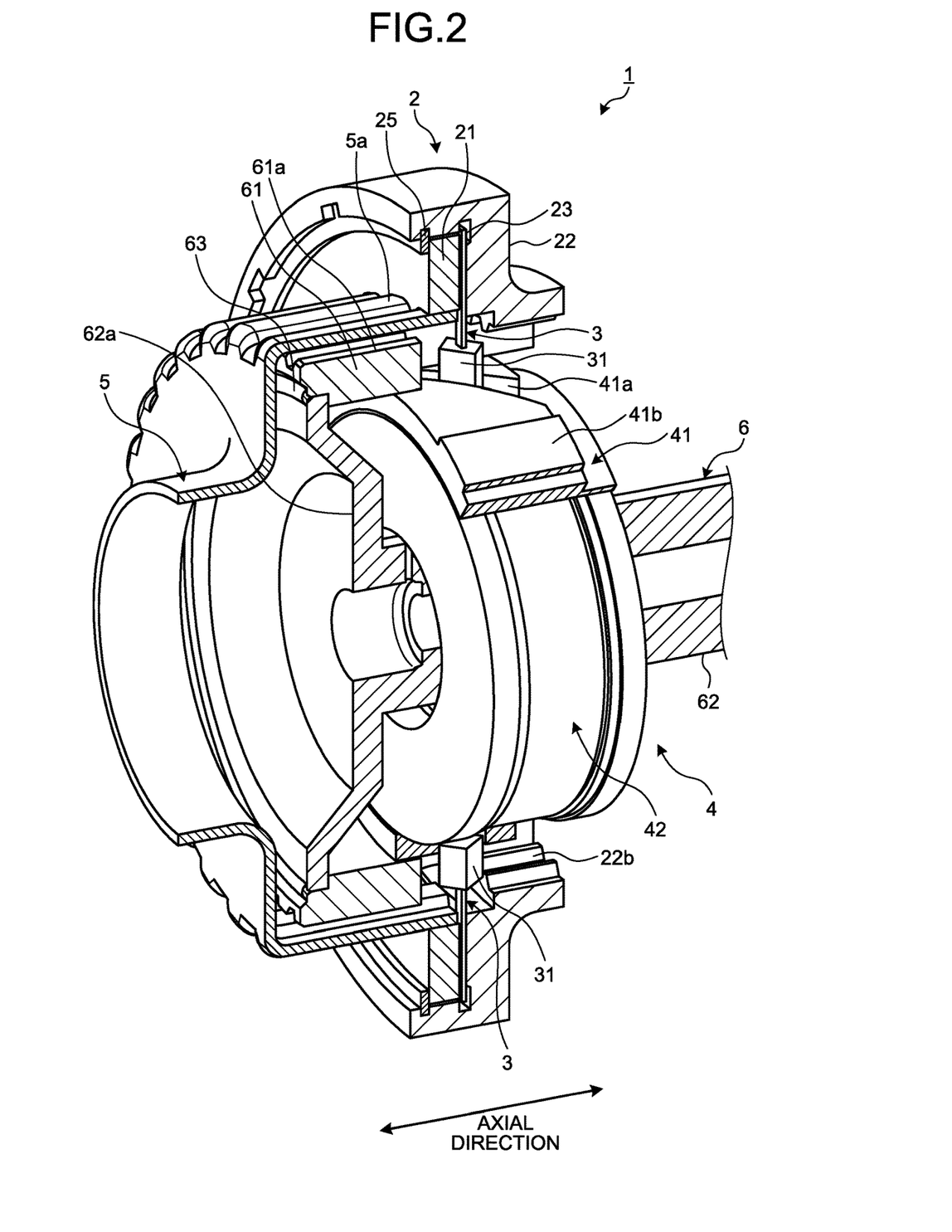
FIG. 2 is a partial cross-sectional view illustrating the engagement device according to the first embodiment.
Figure 3:
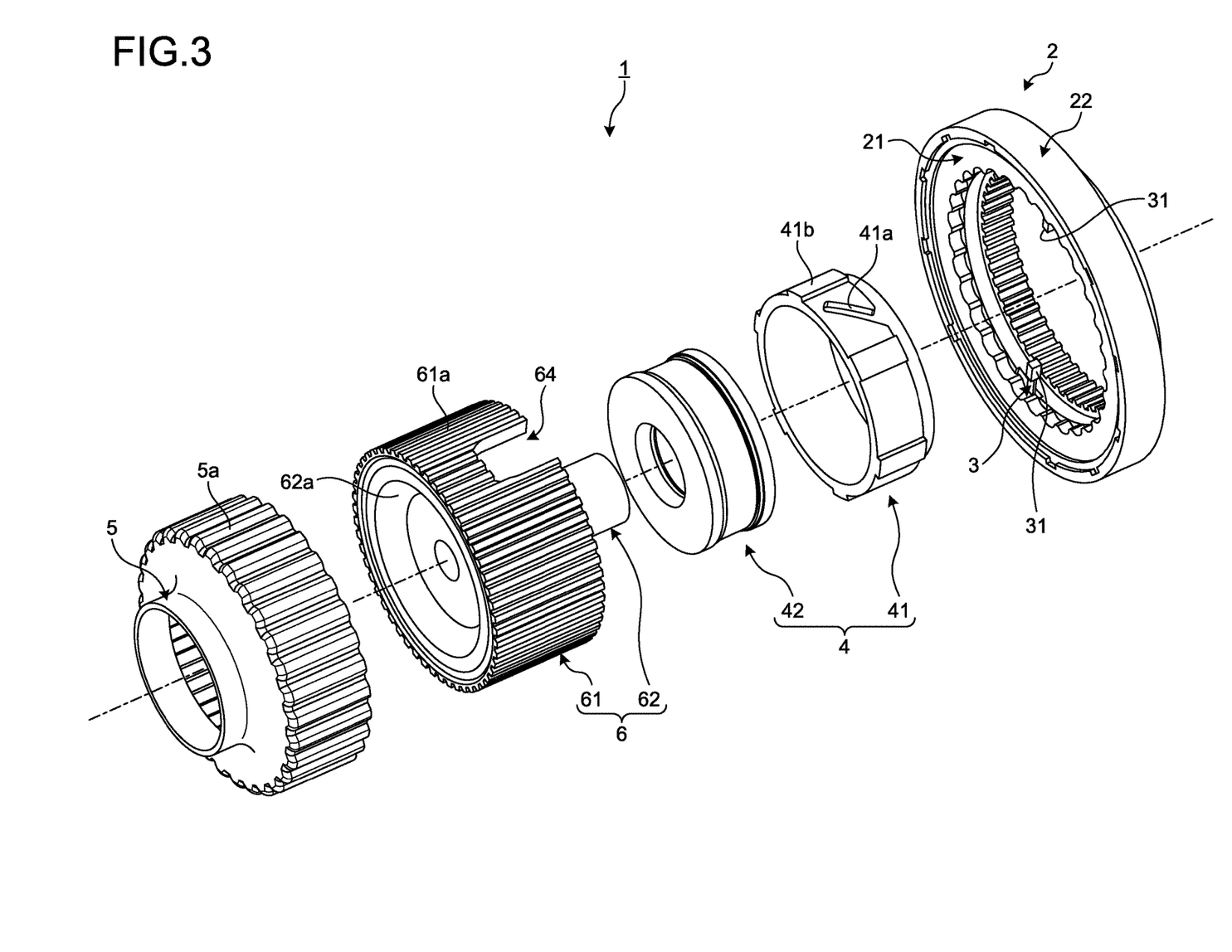
FIG. 3 is an exploded view illustrating the engagement device according to the first embodiment.
Figure 4:
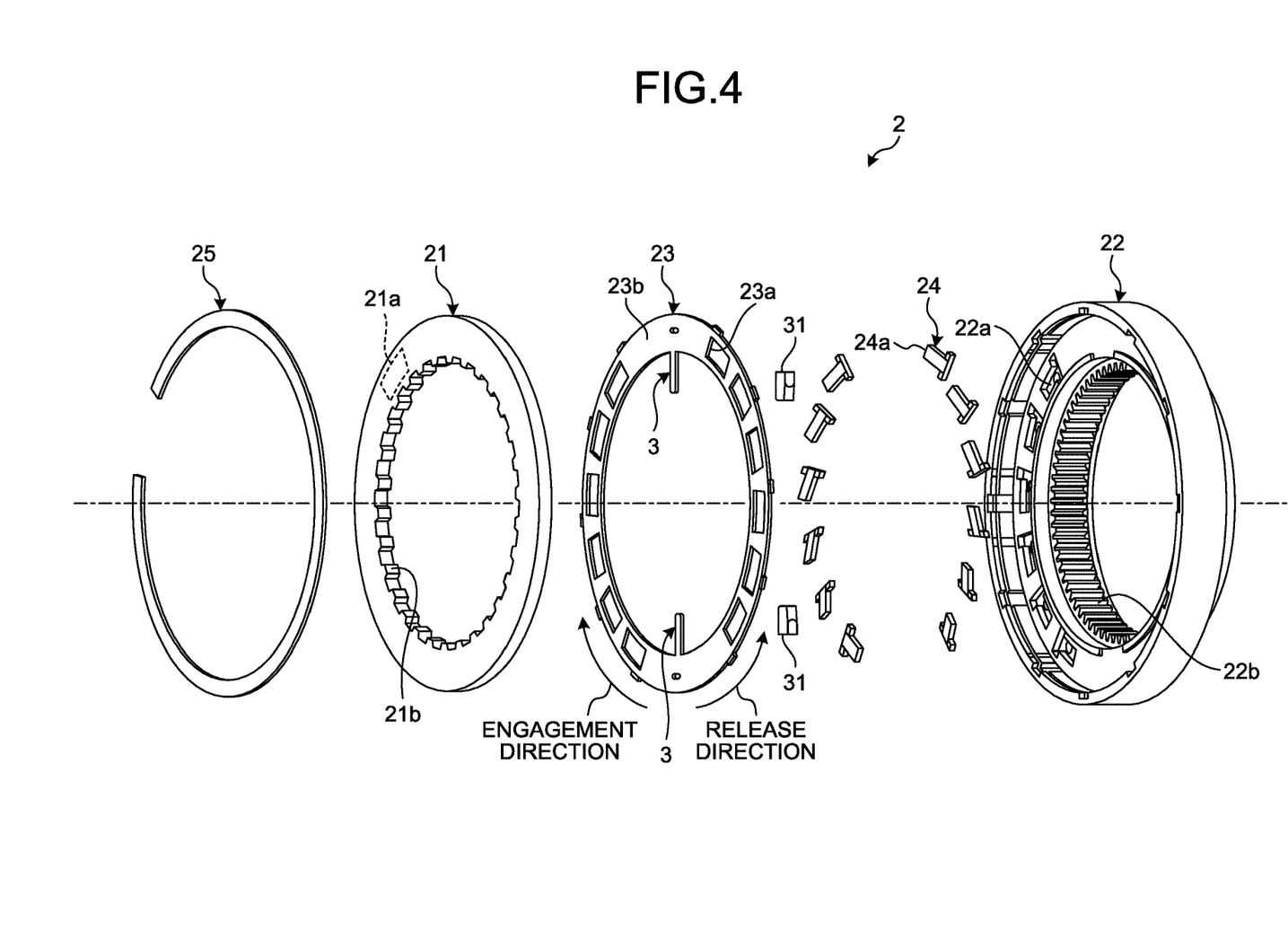
FIG. 4 is an exploded view illustrating a clutch unit.

The engagement device according to a first embodiment will be described with reference to FIGS. 1 to 4. FIG. 1 is a cross-sectional view schematically illustrating the engagement device according to the first embodiment. FIG. 2 is a partial cross-sectional view illustrating the engagement device according to the first embodiment. FIG. 3 is an exploded view illustrating the engagement device according to the first embodiment. FIG. 4 is an exploded view illustrating a clutch unit.

An engagement device 1 includes a clutch unit 2, which transmit or cut off power, a switching unit 3, which switches between a power transmission state and a power cut off state, and an actuator 4, which controls the engagement state and the release state of the clutch unit 2. The example of FIG. 1 illustrates the engagement device 1 that can be applied to a vehicular transmission, and a power, which is transmitted from an input shaft 5, is transmitted to an output shaft 6 via the engagement device 1. The engagement device 1 is accommodated in a transmission case. The engagement device 1 according to the first embodiment has a structure in which the switching unit 3 and the actuator 4 are disposed on the radially inner side of the clutch unit 2. The direction that is along the rotation center axis of the clutch unit 2 will be referred to as an axial direction.

As illustrated in FIGS. 2 and 3, each of the input shaft 5, the output shaft 6, the actuator 4, and the clutch unit 2 is formed in an annular shape. In the engagement device 1, the clutch unit 2 and the actuator 4 are disposed on the same rotation center axis.

As illustrated in FIG. 4, the clutch unit 2 includes a notch plate 21 as an input element, a pocket plate 22 as an output element, a selector plate 23 as a member for switching between the engagement state and the release state, and struts 24 as a plate-shaped engagement pieces. The notch plate 21 and the pocket plate 22 are disposed so as to face each other in the axial direction. The selector plate 23 is disposed between the notch plate 21 and the pocket plate 22. In the clutch unit 2, selective switching between the engagement state and the release state is performed by the posture of the struts 24, the posture of the struts 24 being changed as a result of a rotation of the selector plate 23. In the engagement state, the notch plate 21 and the pocket plate 22 are interconnected such that power can be transmitted therebetween. In the release state, the notch plate 21 and the pocket plate 22 are cut off from each other, so that no power can be transmitted therebetween.

In the pocket plate 22, a plurality of pockets 22a for accommodating the struts 24 is provided at positions separated at predetermined intervals in the circumferential direction in one surface of an annular plate portion. One surface of the pocket plate 22 faces the selector plate 23 and the notch plate 21 in the axial direction. Each of the pockets 22a is shaped so as to be recessed in the plate thickness direction (axial direction) of the plate portion. Urging springs (not illustrated) urging the respective struts 24 to the notch plate 21 side are provided between the bottom portion of the pocket 22a and the struts 24.

The notch plate 21 is an annular plate that is capable of rotating relative to the pocket plate 22 and the selector plate 23. In the surface of the notch plate 21 that faces the selector plate 23 and the pocket plate 22 in the axial direction, a plurality of notches 21a, which are engagement recessed portions with which the struts 24 engage, are provided at positions corresponding to the pockets 22a of the pocket plate 22. Although only one notch 21a is illustrated in FIG. 4, the plurality of notches 21a are provided at positions corresponding to the pockets 22a and the struts 24 in the notch plate 21. The notch plate 21 is accommodated in the cylinder portion of the pocket plate 22 along with the selector plate 23, and the notch plate 21 is provided so as not to be removed from the pocket plate 22 by a snap ring 25 fitted to the inner peripheral portion of the cylinder portion. In the engagement device 1, an inner peripheral spline 21b of the notch plate 21 is spline-fitted to an outer peripheral spline 5a of the input shaft 5, and the notch plate 21 and the input shaft 5 rotate together.

The selector plate 23 is an annular control plate that is disposed between the pocket plate 22 and the notch plate 21 in the axial direction, and is rotatable relative to the pocket plate 22 and the notch plate 21. As illustrated in FIG. 4, the selector plate 23 is provided with a plurality of window holes 23a at positions corresponding to the pockets 22a of the pocket plate 22. The window hole 23a is a strut opening and closing window penetrating an annular plate main body 23b in the plate thickness direction (axial direction). The number of the window hole 23a is the same as the numbers of the pocket 22a and the strut 24.

The selector plate 23 rotates relative to the pocket plate 22 by a predetermined angle around the central axis of the notch plate 21. The selector plate 23 rotates between an engagement position (phase) and a release position (phase) in the circumferential direction. At the engagement position (phase), the position of the window hole 23a substantially coincides with the position of the pocket 22a in the circumferential direction. At the release position (phase), the position of the window hole 23a is circumferentially misaligned with respect to the position of the pocket 22a. The selector plate 23 reaches the engagement position as a result of rotation in the engagement direction and reaches the release position as a result of rotation in the release direction, which is in the direction opposite to the engagement direction. The plate part of the plate main body 23b that forms the spaces between the window holes 23a in the circumferential direction functions as a structure for retracting the strut 24 to the pocket plate 22 side. Accordingly, depending on the circumferential position (phase) of the selector plate 23, switching occurs between an accommodation state where the strut 24 is accommodated in the pocket 22a and a standing state where one end portion 24a of the strut 24 stands to the notch plate 21 side. When the strut 24 has a standing-state posture, the one end portion 24a of the strut 24 is capable of engaging with the notch 21a. As a result of this change in the posture of the strut 24, switching occurs between the engagement state and the release state of the clutch unit 2.

As illustrated in FIG. 4, each of the plurality of struts 24 is held by the pocket plate 22 such that the one end portions 24a of the struts 24 face the same direction in the circumferential direction. In other words, the strut 24 in the standing state is engageable in only one direction. Accordingly, the engagement state of the clutch unit 2 is a one-way clutch state where the notch plate 21 is capable of rotating relative to the pocket plate 22 in only one direction with the strut 24 having the standing-state posture. In a case where the notch plate 21 relatively rotates in the overrun direction, the one end portion 24a of the strut 24 reaches a state (overrun state) where the one end portion 24a does not engage with the notch 21a even if the strut 24 is in the standing state. The overrun direction refers to the rotational direction of the notch plate 21 and the direction of rotation toward the one end portion 24a side from the other end portion side of the strut 24 in the circumferential direction (such as the same direction as the release direction of the selector plate 23 illustrated in FIG. 4).

The selector plate 23 includes the switching unit 3 that switches between the engagement state and the release state of the clutch unit 2. The switching unit 3, which is a part of the selector plate 23, is a plate-shaped protruding portion protruding radially inwards from the inner peripheral portion of the plate main body 23b. The switching unit 3 has a tip portion (inner diameter side end portion) protruding radially inwards beyond an inner diameter R of the clutch unit 2. The inner diameter R of the clutch unit 2 can be expressed as the inner diameter of the pocket plate 22 constituting the main component of the clutch unit 2 and the radial position that is the boundary between the clutch unit 2 and the actuator 4.

As illustrated in FIG. 4, the switching unit 3 is provided in two different places in the circumferential direction of the selector plate 23. A cover member 31 is attached to the tip portion of the switching unit 3. The selector plate 23 is connected to the actuator 4, and the switching unit 3 is connected to the actuator 4 via the cover member 31. A metallic cap constitutes the cover member 31. Switching occurs between the engagement state and the release state of the clutch unit 2 by the actuator 4 circumferentially rotating the selector plate 23 by a predetermined angle.

The actuator 4 includes a cylindrical movable portion 41 connected to the selector plate 23 and an actuator main body 42 generating a force for operating the selector plate 23. As illustrated in FIGS. 1 and 2, the actuator 4 is disposed on the radially inner side of the clutch unit 2. In other words, the actuator 4 is disposed at an axial position overlapping with at least a part of the clutch unit 2 when viewed from the radial direction of the clutch unit 2. The actuator 4 is a linear actuator, and the force from the actuator main body 42 causes the movable portion 41 to move in the axial direction.

An electromagnetic actuator constitutes the actuator 4 illustrated, for example, in FIG. 1. The movable portion 41 is an armature to be moved in the axial direction by an electromagnetic force. The actuator main body 42 is a fixed portion including a coil to generate the electromagnetic force. The actuator main body 42 is mechanically connected to a fixing member such as the transmission case in a state where the coil is disposed on the radially inner side of the movable portion 41. Once the coil is energized, the electromagnetic force is generated in the actuator main body 42. Then, the movable portion 41 moves in the axial direction by receiving the electromagnetic force. The movable portion 41 and the actuator main body 42 are not in contact with each other and are disposed at positions radially separated from each other. When the actuator 4 is viewed from the radial direction, the movable portion 41 is disposed at a position overlapping with the actuator main body 42.

A groove 41a inclined with respect to the axial direction is provided in the outer peripheral portion of the movable portion 41. The groove 41a is a fitting groove to which the switching unit 3 is connected. The switching unit 3 has a plate shape that has a predetermined width in the circumferential direction and has flat surfaces on both sides in the axial direction. An axial load from the movable portion 41 acts on the flat surface via the cover member 31. The cover member 31 is formed in a cap shape covering the entire tip portion of the switching unit 3. Accordingly, the axial load that acts on the flat surface of the switching unit 3 from the movable portion 41 is reduced by the cover member 31. For example, the cover member 31 is shaped so as to be several times wider than the plate width (circumferential length) of the switching unit 3 in the circumferential direction and several times thicker than the plate thickness (axial length) of the switching unit 3 in the axial direction. The cover member 31 has a surface inclined with respect to the axial direction so as to be in surface contact with the wall surface of the groove 41a.

As illustrated in FIG. 1, the cover member 31 is fitted in the groove 41a. Once the movable portion 41 moves in the axial direction, the cover member 31 slides in the circumferential direction along the groove 41a. As a result, the switching unit 3 is operated in the circumferential direction. As a result, the selector plate 23 rotates in the circumferential direction as a switching operation. In other words, the movable portion 41 and the switching unit 3 are movable relative to each other. Since the groove 41a in the connection place is inclined with respect to the axial direction, the linear motion of the movable portion 41 is converted into the rotational motion of the switching unit 3. Accordingly, by the movable portion 41 being operated in the axial direction, the circumferential position of the selector plate 23 can be controlled to the engagement position and the release position. In addition, since the movable portion 41 is mechanically connected to the pocket plate 22, the phase of the selector plate 23 with respect to the pocket plate 22 is controlled with ease.

The input shaft 5 is a hollow rotary shaft connected to the notch plate 21. The outer peripheral spline 5a of the input shaft 5 and the inner peripheral spline 21b of the notch plate 21 are spline-fitted to each other. This fitting part interconnects the input shaft 5 and the notch plate 21 in an integrally rotatable manner and such that the input shaft 5 and the notch plate 21 do not move relative to each other in the axial direction.

The output shaft 6 is a hollow rotary shaft having a structure in which a large-diameter tube portion 61 and a small-diameter shaft portion 62 are integrated with each other. The tube portion 61 is disposed on the outer diameter side of the shaft portion 62. The shaft portion 62 is a shaft portion smaller in diameter than the tube portion 61 and has a flange portion 62a on one side in the axial direction. The flange portion 62a is joined to the tube portion 61 by welding. A welded portion 63 between the tube portion 61 and the flange portion 62a is formed in an annular shape along the circumferential direction. The tube portion 61 and the shaft portion 62 are integrated with each other by the welded portion 63.

An outer peripheral spline 61a of the tube portion 61 and an inner peripheral spline 22b of the pocket plate 22 are spline-fitted to each other. This fitting part interconnects the notch plate 21 and the output shaft 6 in an integrally rotatable manner and constitutes a power transmission path for power transmission from the input shaft 5 to the output shaft 6.

The support structure of the actuator 4 will be described below. In the engagement device 1, the output shaft 6 supports the actuator 4. The movable portion 41 is supported by the tube portion 61. The actuator main body 42 is supported by the shaft portion 62. In other words, the engagement device 1 has a structure in which the actuator 4 is supported by one member, that is, the output shaft 6.

Specifically, an outer peripheral spline 41b of the movable portion 41 and the inner peripheral spline of the tube portion 61 are spline-fitted to each other. This fitting part is a structure that supports the movable portion 41 on the inner peripheral portion of the tube portion 61, interconnects the movable portion 41 and the output shaft 6 in an integrally rotatable manner, and is not included in the power transmission path for power transmission from the input shaft 5 to the output shaft 6.

The tube portion 61 is provided with a notch portion 64 as a structure for radial penetration by the switching unit 3. The notch portion 64 is formed on the side that is opposite to the side of the welded portion 63 in the axial direction and is provided in a predetermined range in the circumferential direction. The switching unit 3 is disposed so as to be inserted through the notch portion 64. As a result, the outer peripheral portion of the movable portion 41 and the switching unit 3 of the selector plate 23 are interconnected.

The actuator main body 42 is supported by a bearing 7 so as to be rotatable relative to the output shaft 6. As illustrated in FIG. 1, the inner peripheral portion of the actuator main body 42 is attached to the outer peripheral portion of the shaft portion 62 via the bearing 7. The coil of the actuator main body 42 is electrically connected to a battery provided outside the transmission case via an electric wire (not illustrated). By switching being performed between energization and non-energization of the coil of the actuator main body 42, the axial position of the movable portion 41 is displaced and the circumferential position of the switching unit 3 is switched between the predetermined engagement and release positions.

As described above, the first embodiment has a structure in which the actuator 4 fits on the radially inner side of the clutch unit 2, and thus the size of the engagement device 1 can be reduced. In addition, the engagement device 1 is a mechanical clutch for operating the control plate-type switching unit 3. The load for controlling the engagement state and the release state of the mechanical clutch is sufficiently smaller than the load that supports the transmission torque of the clutch unit 2. Accordingly, the size of the actuator 4 can be reduced. For example, in a transmission that is provided with the engagement device 1, the degree of freedom of disposition of components provided in the case is increased, and thus the transmission can be reduced in size.

Further, the actuator 4 can be disposed on the inner diameter side of the clutch unit 2 and the notch plate 21, and the pocket plate 22 as the main body of the clutch unit 2 can be large in diameter. Accordingly, it is possible to further increase the transmission torque capacity. As a result, the engagement device 1 can be installed on a path requiring a large transmission torque capacity.

The engagement device 1 has a structure in which the pocket plate 22 holding the strut 24 is mechanically connected (spline-fitted) so as to rotate integrally with the movable portion 41 of the actuator 4, and it is possible to control the posture of the struts 24 by relatively operating the switching unit 3 by a predetermined amount with respect to the pocket plate 22. Since the movable portion 41 and the clutch unit 2 integrally rotate with each other in this manner, the operation accuracy of the switching unit 3 is improved, and thus the operation range of the actuator 4 as well as the operation-range variation (tolerance) of the switching unit 3 can be reduced. Accordingly, the size of the engagement device 1 can be further reduced.

In the actuator 4, a radial clearance is required between the movable portion 41 and the actuator main body 42 for the movable portion 41 to move relative to the actuator main body 42. In the engagement device 1, the axial positions (positions in radial direction) of the movable portion 41 and the actuator main body 42 of the actuator 4 can be determined by a single member, that is, the output shaft 6. Accordingly, it is possible to minimize the variation (coaxiality) of the radial clearance and reduce the loss of the actuator 4.

The switching unit 3 of the selector plate 23, which is a control plate, and the movable portion 41 of the actuator 4 are interconnected via the cover member 31. When the actuator 4 applies an operating force to the selector plate 23, the deformation of the switching unit 3 and the selector plate 23 and the surface pressure with the actuator 4 are reduced. As a result, the operational responsiveness of the selector plate 23 is improved. Further, the frictional force of the sliding portion between the movable portion 41 of the actuator 4 and the cover member 31 is reduced and controllability and durability are improved.

Modification Example

It is possible to constitute a modification example with regard to the engagement device 1 according to the first embodiment. For example, the switching unit 3 is not limited to the planar shape extending radially inwards from the selector plate 23, and the switching unit 3 may be formed in a bent structure. In other words, the structure of the selector plate 23 may be shaped such that the axial position of the plate main body 23b and the axial position of the tip portion of the switching unit 3 are provided at different positions.

Although it is possible to withstand a strong surface pressure by providing two switching units 3, the switching unit 3 is not limited in number to two different circumferential places and may be provided in a plurality of places. The force that is required for the actuator main body 42 can be reduced as the operating force acts on the selector plate 23 from the movable portion 41 via the switching unit 3 in a plurality of circumferential places. As a result, the actuator 4 can be reduced in size. Further, it is possible to reduce unbalance during rotation of the clutch unit 2 by disposing the plurality of switching units 3 at positions equally spaced in the circumferential direction.

The cover member 31 may have any shape insofar as the durability of the switching unit 3 can be improved with respect to the force received from the movable portion 41. Accordingly, the cover member 31 is not limited in shape to sliding in a state of being in surface contact with the groove 41a, and the cover member 31 may have a shape allowing line contact or point contact with the groove 41a. As described above, the cover member 31 can be formed in, for example, a shape facilitating sliding of the groove 41a or a shape with which the axial load that acts on the switching unit 3 can be reduced.

The cover member 31 may be resinous and does not necessarily have to be metallic. In short, the cover member 31 may be made of a high-rigidity material, and thus the cover member 31 can be made of a high-rigidity resin or the like. It is also possible to reduce the weight of the engagement device 1 with the resinous cover member 31.

An urging force from a spring member such as a return spring may act on the cover member 31. For example, a configuration may be adopted in which a spring member (elastic body) is disposed so as to be sandwiched between the flange portion 62a of the output shaft 6 and the cover member 31 and the spring member generates an urging force in the axial direction. The movable portion 41 can be operated in the axial direction by the urging force (axial force) from the spring member acting on the movable portion 41 via the cover member 31. As a result, the circumferential position of the switching unit 3 can be returned to the engagement position or the release position. The spring member is not limited to have a structure attached to the inner wall surface of the flange portion 62a. As an example, a snap ring may be provided in the inner peripheral portion of the tube portion 61 and the spring member may be disposed between the snap ring and the cover member 31. Alternatively, the spring member may be provided on the side that is opposite to the side of the flange portion 62a with respect to the switching unit 3 in the axial direction.

In the engagement device 1, the output shaft 6 may function as an input side rotary shaft and the input shaft 5 may function as an output side rotary shaft so that the power transmission direction is reversed. In this case, the pocket plate 22 becomes the input element and the notch plate 21 becomes the output element. In a case where the input side and the output side are not particularly distinguished from each other, the input shaft 5 and the output shaft 6 can be expressed as rotary shafts.

The engagement device 1 may function as a brake. In this case, one of the input shaft 5 and the output shaft 6 is a rotary shaft and the other is a fixed shaft. Likewise, one of the notch plate 21 and the pocket plate 22 is a rotating element and the other is a fixed element.

The engagement state of the clutch unit 2 is not limited to the one-way clutch state and may also be a state where the strut 24 in the standing state is bidirectionally engaged irrespective of the rotational direction. In this case, the plurality of struts 24 include the strut 24 in which the one end portion 24a is held so as to face one side in the circumferential direction and the strut 24 in which the one end portion 24a is held so as to face the other side in the circumferential direction.

Second Embodiment

Figure 5:
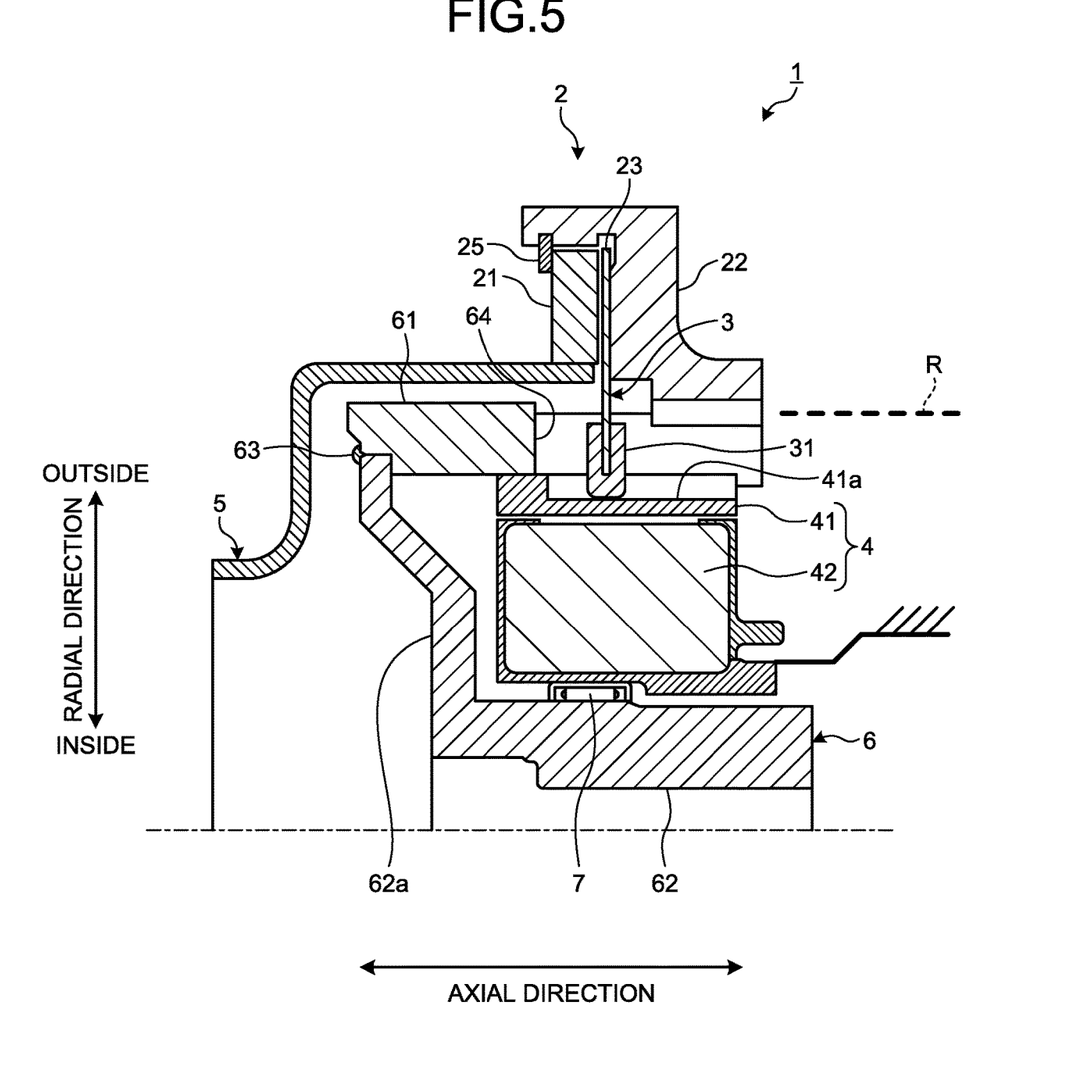
FIG. 5 is a cross-sectional view schematically illustrating a engagement device according to a second embodiment.
Figure 6:
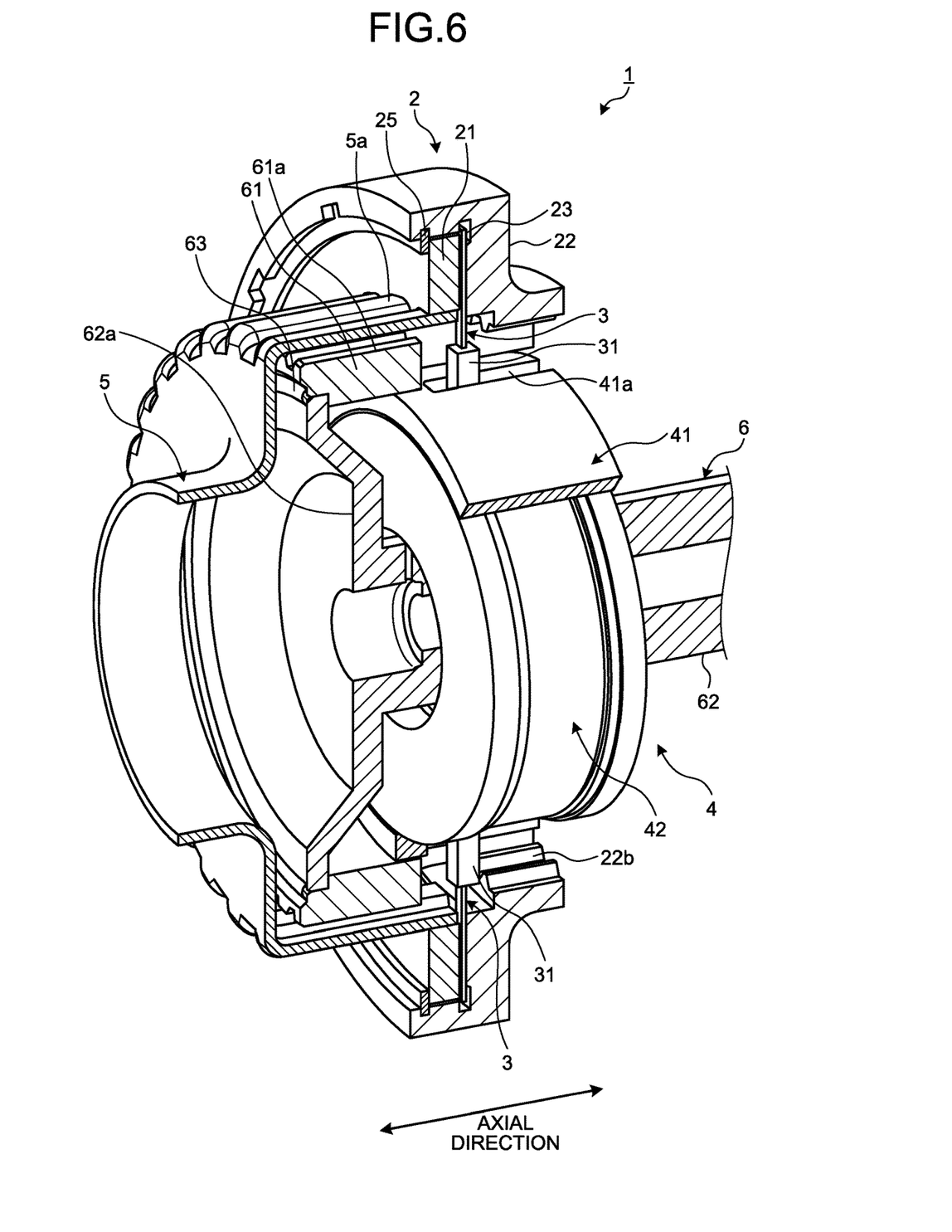
FIG. 6 is a partial cross-sectional view illustrating the engagement device according the second embodiment.
Figure 7:
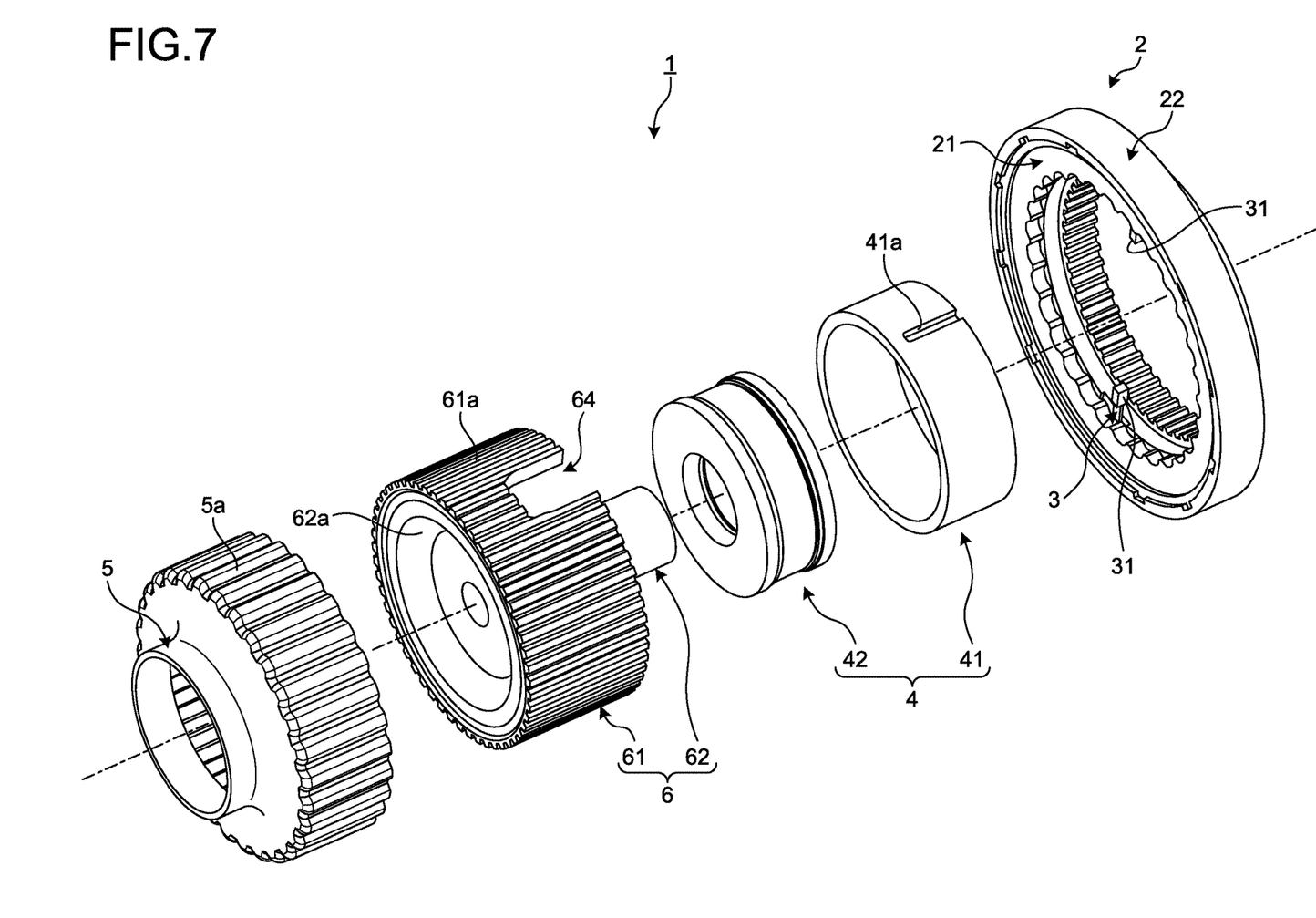
FIG. 7 is an exploded view illustrating the engagement device according to the second embodiment.

The engagement device 1 according to a second embodiment will be described below with reference to FIGS. 5 to 7. FIG. 5 is a cross-sectional view schematically illustrating the engagement device according to the second embodiment. FIG. 6 is a partial cross-sectional view illustrating the engagement device according to the second embodiment. FIG. 7 is an exploded view illustrating the engagement device according to the second embodiment. In the description of the second embodiment, the descriptions of the configurations that are identical to those in the first embodiment will be omitted and the same reference numerals are herein used.

The second embodiment differs from the first embodiment in terms of the operation direction of the movable portion 41. The actuator 4 of the second embodiment is a rotary actuator in which the movable portion 41 rotates in the circumferential direction. The movable portion 41 is a rotating member that rotates with the output shaft 6. The movable portion 41 is capable of rotating relative to the tube portion 61 within a predetermined rotation angle range. The entire outer peripheral surface of the movable portion 41 is formed in an arc shape except for the groove 41a. The entire inner peripheral surface of the tube portion 61 is formed in an arc shape. As a result, the movable portion 41 and the output shaft 6 are capable of rotating relative to each other. Further, it is possible to rotate the selector plate 23 relative to the pocket plate 22 by rotating the movable portion 41. In the second embodiment as well as the first embodiment, the inner peripheral spline 22b of the pocket plate 22 and the outer peripheral spline 61a of the output shaft 6 are spline-fitted to each other.

As illustrated in FIGS. 4 and 5, the groove 41a provided in the outer peripheral portion of the movable portion 41 linearly extends along the axial direction. The cover member 31 and the switching unit 3 fitted in the groove 41a receive a circumferential force (rotational force) from the movable portion 41. In the second embodiment, the selector plate 23 and the movable portion 41 are mechanically interconnected so as to rotate integrally with each other. By switching being performed between energization and non-energization of the coil of the actuator main body 42, the movable portion 41 and the selector plate 23 rotate relative to the pocket plate 22 and the circumferential position of the selector plate 23 is switched between the engagement position and the release position.

According to the second embodiment described above, the size of the engagement device 1 can be reduced as in the first embodiment even in a case where the actuator 4 is a rotary actuator. In other words, the actuator 4 is not limited to a linear actuator in which the movable portion 41 moves rectilinearly, and also applicable is a rotary actuator in which the movable portion 41 performs a rotational motion.

The radially inner side beyond the clutch unit 2 in the description means that the axial position does not necessarily overlap with the axial position of the clutch unit 2. The radially inner side of the clutch unit 2 means that the axial position overlaps with the axial position of the clutch unit 2. In short, the actuator 4 is disposed radially inwards beyond the inner diameter R of the clutch unit 2.

According to the present disclosure, the actuator main body generating a force for operating the selector plate can be disposed radially inwards beyond the clutch unit. As a result, it is possible to suppress an increase in the size of the structure including the clutch unit and the actuator.

According to an embodiment, it is possible to suppress an increase the size in the axial dimension of the structure including the clutch unit and the actuator.

According to an embodiment, the notch plate and the pocket plate responsible for torque transmission can be configured to be large in diameter by the actuator main body being disposed in the radially inner space of the clutch unit. As a result, it is possible to increase the transmission torque capacity of the clutch unit.

According to an embodiment, the movable portion is mechanically connected to the pocket plate, and thus the phase of the selector plate with respect to the pocket plate is controlled with ease. Further, since the selector plate rotates along the groove when the operating portion axially moves relative to the actuator main body, it is possible to easily switch between the engagement state and the release state of the clutch unit.

According to an embodiment, the movable portion does not axially move relative to the actuator main body, and thus it is possible to suppress an increase the size in the axial dimension of the actuator.

According to an embodiment, the movable portion and the actuator main body are supported by one member, and thus the accuracy of the clearance between the actuator main body and the movable portion can be improved.

According to an embodiment, a force is transmitted from the movable portion to the switching unit via the cover member by the cover member being provided, and thus the durability of the switching unit can be improved.

According to an embodiment, a force acts on the selector plate from the movable portion in a plurality of places, and thus the operating force that needs to be generated in the actuator main body can be reduced. As a result, the size of the actuator can be reduced. In addition, it is possible to reduce an unbalanced state during rotation.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An engagement device comprising:
a clutch unit including
annular input and output elements disposed so as to face each other in an axial direction,
plate-shaped engagement pieces provided in either the input element or the output element, and
an annular selector plate disposed between the input element and the output element and configured to switch a posture of the engagement pieces and switch between an engagement state where power is transmitted between the input element and the output element, which are interconnected by the engagement pieces and a release state where power transmission is cut off between the input element and the output element by changing the posture of the engagement pieces by rotating the selector plate; and
an actuator configured to operate the selector plate and control the engagement state and the release state of the clutch unit,
wherein the actuator includes an actuator main body configured to generate a force for operating the selector plate, and the actuator main body is disposed radially inwards beyond the clutch unit, and
wherein the actuator main body is non-rotatably fixed.

2. The engagement device according to claim 1, wherein the actuator main body is disposed at a position overlapping with at least a part of the clutch unit when viewed from a radial direction of the clutch unit.

3. The engagement device according to claim 1, wherein the clutch unit includes:
a pocket plate having one surface where a plurality of accommodating recessed portions is formed;
the plate-shaped engagement pieces accommodated in the respective accommodating recessed portions;
a notch plate where a plurality of engagement recessed portions is formed in a surface facing the one surface of the pocket plate; and
the selector plate,
one of the pocket plate and the notch plate constitutes the input element,
another of the pocket plate and the notch plate constitutes the output element, the clutch unit is switched between a standing state, where one end portions of the engagement pieces stand to a side of the engagement recessed portions, and an accommodation state, where one end portions of the engagement pieces are accommodated in the accommodating recessed portions, by a rotation of the selector plate relative to the pocket plate, the engagement state is the standing state, and the release state is the accommodation state.

4. The engagement device according to claim 3, wherein the actuator includes:

a movable portion, having a cylindrical shape, configured to move in the axial direction by receiving an axial force from the actuator main body, the movable portion is mechanically connected to the pocket plate so as to rotate together, a groove, having an extending direction thereof being inclined with respect to the axial direction, is provided in an outer peripheral portion of the movable portion, the selector plate is connected to the groove, and switching between the engagement state and the release state of the clutch unit occurs as the selector plate rotates relative to the pocket plate by the movement of the movable portion relative to the selector plate in the axial direction.

5. The engagement device according to claim 4, further comprising:

a rotary shaft including a shaft portion, having a small diameter, and a tube portion, having a greater diameter, disposed on an outer diameter side of the shaft portion, the shaft portion and the tube portion being integrated with each other, wherein the actuator main body is supported by the shaft portion via a bearing, and the movable portion is supported by the tube portion.

6. The engagement device according to claim 4, wherein the selector plate includes a switching unit protruding radially inwards from an annular plate main body as a part connected to the actuator, the switching unit is fitted in the groove of the movable portion in a state where a cover member is attached to a tip portion of the switching unit, and the movable portion operates the switching unit via the cover member.

7. The engagement device according to claim 4, wherein the selector plate and the movable portion are interconnected in a plurality of circumferentially different positions.

8. The engagement device according to claim 3, wherein the actuator includes:

the actuator main body, which is non-rotatably fixed; and a movable portion, having a cylindrical shape, configured to rotate by receiving a circumferential force from the actuator main body, a groove is provided along the axial direction in an outer peripheral portion of the movable portion, the selector plate is connected to the groove, and switching between the engagement state and the release state of the clutch unit occurs as the selector plate rotates relative to the pocket plate by the rotation of the movable portion relative to the pocket plate.

9. The engagement device according to claim 8, further comprising:

a rotary shaft including a shaft portion, having a small diameter, and a tube portion, having a greater diameter, disposed on an outer diameter side of the shaft portion, the shaft portion and the tube portion being integrated with each other, wherein the actuator main body is supported by the shaft portion via a bearing, and the movable portion is supported by the tube portion.

10. The engagement device according to claim 8, wherein the selector plate includes a switching unit protruding radially inwards from an annular plate main body as a part connected to the actuator, the switching unit is fitted in the groove of the movable portion in a state where a cover member is attached to a tip portion of the switching unit, and the movable portion operates the switching unit via the cover member.

11. The engagement device according to claim 8, wherein the selector plate and the movable portion are interconnected in a plurality of circumferentially different positions.

* * * * *